United States Patent [19]
Pohl et al.

[11] 3,874,930
[45] Apr. 1, 1975

[54] FUEL CELL SYSTEM INCLUDING SOURCE OF FUEL CONTAINING HYDROGEN SULFIDE AND METHOD OF USING

[75] Inventors: Franz A. Pohl, Gotzenhain; Harald Böhm, Oberursel; Joachim Heffler, Grossauheim, all of Germany

[73] Assignee: Licentia Patent-Verwaltungs-G.m.b.H, Frankfurt, Germany

[22] Filed: Jan. 29, 1970

[21] Appl. No.: 6,883

[30] Foreign Application Priority Data
Feb. 1, 1969   Germany............................ 1905056

[52] U.S. Cl. .......................... 136/86 E, 136/120 FC
[51] Int. Cl. .......................................... H01m 27/30
[58] Field of Search ........ 136/86, 120 FC; 252/439

[56] References Cited
UNITED STATES PATENTS

| | | | |
|---|---|---|---|
| 2,946,836 | 7/1960 | Justi et al...................... | 136/120 FC |
| 3,198,667 | 8/1965 | Gladrow et al..................... | 136/122 |
| 3,380,856 | 8/1968 | Pohl.............................. | 136/120 FC |
| 3,480,479 | 11/1969 | Nestor ............................. | 136/86 D |

OTHER PUBLICATIONS
Kirk–Othmer, Encyclopedia of Chemical Technology, Vol. 10, pages 448–450, Jan. 4, 1967, TP 9 E68.

*Primary Examiner*—L. Dewayne Rutledge
*Assistant Examiner*—M. J. Andrews
*Attorney, Agent, or Firm*—Spencer & Kaye

[57] ABSTRACT

By including tungsten disulfide and/or molybdenum disulfide in the fuel electrode of a fuel cell, poisoning effects previously experienced with fuels containing hydrogen sulfide are avoided.

27 Claims, 3 Drawing Figures

Inventor:
Franz Arthur Pohl
Harald Böhm
Joachim Heffler
BY Spencer & Kaye
ATTORNEYS 3,874,930

FUEL CELL SYSTEM INCLUDING SOURCE OF FUEL CONTAINING HYDROGEN SULFIDE AND METHOD OF USING

BACKGROUND OF THE INVENTION

The present invention relates to a fuel electrode and its use in a fuel cell with gaseous fuel, oxygen as oxidant, and acid electrolyte.

A known type of fuel cell uses gaseous fuel and oxygen as oxidant. The fuel electrodes of such cells are made of nickel or platinum, while electrodes of coal, silver or nickel serve as the oxygen electrode.

It has been proposed that an electrode of tungsten carbide be used for the electrochemical oxidation of impure hydrogen. In carrying this out, it has been found that uncleaned oxygen from the air can also be used for the oxidation — without there occurring a lessening of the activity of the electrode material.

Unfortunately, many of the fuel electrodes of the prior art undergo a "poisoning" when the fuel is, or contains, hydrogen sulfide; that is, with increasing time of opertion of a fuel cell using a fuel at least containing hydrogen sulfide the ability of the fuel electrode to catalyze the oxidation of the fuel is progressively lost.

SUMMARY OF THE INVENTION

An object of the present invention, therefore, is to provide a fuel electrode that can be used with fuel containing hydrogen sulfide.

This as well as other objects will become apparent in the discussion that follows.

It has been surprisingly discovered that a fuel electrode of tungsten disulfide, $WS_2$, and/or molybdenum disulfide, $MoS_2$, and an electrically conductive additive mades possibe the continued oxidation of gases containing hydrogen sulfide, without the appearance of poisoning.

DESCRIPTION OF THE PREFERRED EMBODIMENTS

To the tungsten disulfide or molybdenum disulfide there is mixed an electrically conductive additive. This is advantageously tungsten carbide in an amount forming from 10 to 50 weight-percent of the total mixture. An especially favorable result relative to achievable current density is obtained when the additive is present at about 20 weight-percent. Hard coal may be used in place of the tungsten carbide at the same percentages. These additives are both inert to hydrogen sulfide.

According to a further development of the invention, the fuel electrode of tungsten disulfide or molydenum disulfide and tungstne carbide or hard coal contains as a second additive one or more of the sulfides of molybdenum, tantalum, vanadium, titanium, or zirconium. The percentage of these sulfides is chosen such that their sum is at most equal to the percentage of tungsten disulfide or molybdenum disulfide in the electrode.

Fuel electrodes according to the invention can be formed as porous electrodes in known manner. The starting materials in the form of powders are mixed with a binder, for example polyethylene, the amount of the binder forming 2 to 10 weight-percent of the total mixture. The mixture is then compacted by pressing and finally sintered.

A porous coal electrode may be used as the oxygen electrode of the fuel cell of the invention.

The fuel electrodes of the present invention are especially advantageous for the electrochemical oxidation of gas containing hydrogen sulfide. During this oxidation, the hydrogen sulfide is changed to water and zerovalent sulfur. This transformation is accompanied by the production of electrical current. The hydrogen sulfide causes no poisoning of the fuel electrode. It is advantageous to use sulfuric acid as the electrolyte of the fuel cell of the invention. Especially favorable results are achieved using 2-normal acid.

The special advantage of the present invention arises not only in that the electrochemical transformation of hydrogen sulfide is made possible in a technically feasible manner. An especially important advantage is that the present invention makes technically feasible the electrochemical burning of uncleaned natural gas. However, the natural gas still has to be first transformed by steam cracking into carbon monoxide, carbon dioxide, and hydrogen.

With a mixture of hydrogen sulfide and hydrogen, or with hydrogen sulfide alone, as fuel, electrodes according to the present invention yield current densities of from 10 to 50 milliamps per square centimeter.

Representative of the practice of the present invention are the following examples:

EXAMPLE I

The following powders are mixed:
20 weight-% tungsten carbide powder made as described in Example 1 of the application of Harald Böhm et al., filed Nov. 28, 1969, for an "Electrode Material";
72 weight-% tungsten disulfide having a particle size of 0.3 microns; and
8 weight-% polyethylene of particle size range between 90 and 150 microns.

Figure 1:
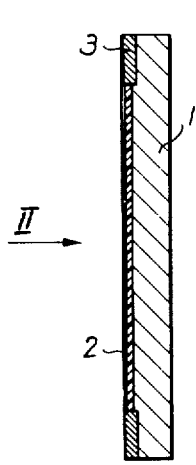
FIG. 1 is a sectional view of an electrode of the invention, as viewed along the line 1—1 of FIG. 2.

This mixture is compacted at a pressure of $0.55 \times 10^6$ ponds (the unit of force in the cgs system) per $cm^2$ to a fuel electrode 1 shown in FIG. 1 having a thickness of 3 mm and a circular area of 9 $cm^2$. The electrode 1 is sintered at 150°C for 30 minutes.

Figure 2:
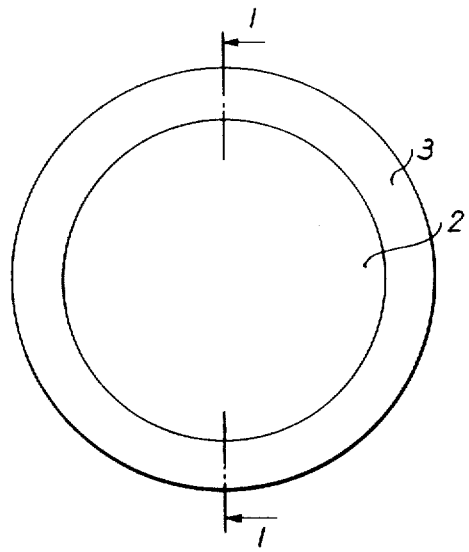
FIG. 2 is a view of the electrode of FIG. 1 as seen in the direction of arrow II of FIG. 1.

The electrode 1 thus prepared is then provided with a graphite ring 3 and a polytetrafluoroethylene disc 2 in the manner described in Example 1 of the application of Harald Böhm et al., filed Dec. 18, 1969, for an "Electrical Contact." Ring 3 ad disc 2 are shown, for example, in FIGS. 1 and 2.

Figure 3:
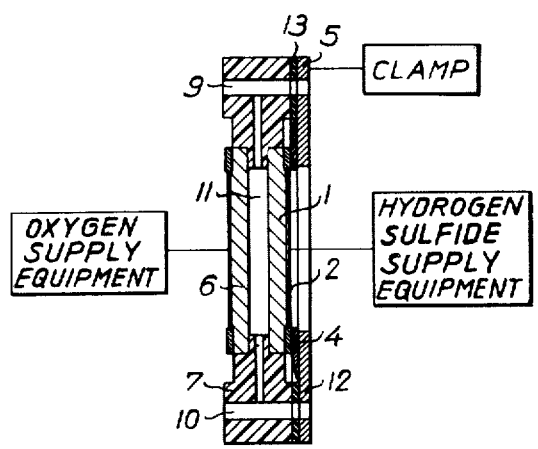
FIG. 3 is a view similar to that of FIG. 1 but containing additional structure.

Referring to FIG. 3, the electrode 1 of FIGS. 1 and 2 is shown assembled with other parts of a fuel cell. Electrode 6 is a porous carbon electrode, such as the active coal layer 8 disclosed in the application of Franz Pohl et al., U.S. Ser. No. 785,887, filed Dec. 23, 1968, for a "Fuel Cell," or such as the hard coal electrode disclosed in U.S. Application Ser. No. 771,170, filed Oct. 28, 1968, by Harald Böhm for an "Electrode for an Electrochemical Cell and a Method for Producing the Electrode." Electrode 6 is shown provided with a ring 3 and coating 2 of the type provided for electrode 1.

Both electrode 1 and electrode 6 are set into a plastic frame 7 which is electrically non-conductive and inert to the electrolyte that is to be used, 2 normal sulfuric acid in this example. The frame 7 is provided with conduit system 9 for electrolyte removal and conduit system 10 for electrolyte inflow. During operation of the cell, electrolyte is present in the electrolyte chamber 11 between the electrodes 1 and 6.

Oxygen and hydrogen sulfide supply equipment is provided, so that these gases may diffuse through electrodes 6 and 1, respectively, during operation of the cell. This equipment, which is conventional, has been illustrated by a labeled box since its detailed illustration is not essential for a proper understanding of the invention.

The manner in which the electrodes are held in place in the frame is illustrated for electrode 1. An annular, conical plate spring 4 presses against ring 3. This spring 4 is made of a conductive material, such as steel, and is shown in FIG. 4c of page 17, volume 13, McGraw-Hill Encyclopedia of Science and Technology, 1966, where it is called a Belleville spring. Backing up spring 4 is a steel ring 12 which may in turn abut against a terminal of a motor. During operation of the cell, current flow is by way of spring 4 to the load, for instance a motor. The pressure supplied to steel ring 12 may be supplied, for example, by a conventional clamp. This is illustrated by a labeled box in the drawing, since its detailed illustration is not essential for a proper understanding of the invention. Alternatively, the pressure may be supplied by the frame of another cell. The steel ring 12 bears against the frame 7 by way of an annular, rubber gasket 13. Holes are provided in the steel ring 12 for the conduit systems 9 and 10. A rubber tube (not shown) is inserted into the bores of these holes when the conduit systems are connected to, for example, an electrolyte circulating system, so that electrolyte does not contact the steel.

With oxygen and hydrogen sulfide gas pressures each at 150 millimeters of water, electrode thickness of 3 mm, 2 normal $H_2SO_4$ as electrolyte, and a temperature of 60° C, electrical current densities of 10 to 50 milliamps per $cm^2$ are achieved.

EXAMPLE II

One proceeds as in Example I, except that the 20 weight-% tungsten carbide is replaced by an equal weight of hard coal having a particle size of 10 microns.

EXAMPLE III

One proceeds as in Example I, except that the 72 weight-% tungsten disulfide is replaced by an equal weight of molybdenum disulfide of 0.3 micron particle size.

EXAMPLES IV – VIII

One proceeds as in Example I, except that the weight of tungsten disulfide is reduced to form 36 weight-% of the total mixture and the mixture additionally contains 36 weight-% of 0.3 micron material as follows:

|  | Ex. IV | Ex. V | Ex. VI | Ex. VII | Ex. VIII |
|---|---|---|---|---|---|
| Material | $MoS_2$ | $Ta_2S_1$ | VS | TiS | $ZrS_2$ |

EXAMPLES IX – XIII

One proceeds as in Example III, except that the weight of molybdenum disulfide is reduced to form 36 weight-% of the total mixture and the mixture additionally contains 36 weight-% of 0.3 micron material as follows:

|  | Ex. IX | Ex. X | Ex. XI | Ex. XII | Ex. XIII |
|---|---|---|---|---|---|
| Material | $MoS_2$ | $Ta_2S_1$ | VS | TiS | $ZrS_2$ |

EXAMPLE XIV

One proceeds as in Example I, except that the hydrogen sulfide fuel is replaced by a fuel containing 96 volume-% hydrogen and 4 volume-% hydrogen sulfide.

Hard coal (mentioned on page 5 line 12) means a technical product supplied by RINGSDORFF-WERKE, D 532 Bad Godesberg-Mehlem under the commercial name: "EK 15."

It will be understood that the above description of the present invention is susceptible to various modifications, changes and adaptations, and the same are intended to be comprehended within the meaning and range of equivalents of the appended claims.

We claim:

1. A fuel cell system for electrochemically oxidizing gaseous hydrogen sulfide to produce electric current therefrom comprising:
   a. a fuel cell containing a fuel electrode resistant to poisoning by hydrogen sulfide and consisting essentially of at least one compound selected from the group consisting of tungsten disulfide and molybdenum disulfide, and an additive which is electrically conductive and inert to hydrogen sulfide;
   b. gaseous fuel at least containing hydrogen sulfide in contact with said fuel electrode; and
   c. supply means connected to said fuel cell and containing gaseous fuel at least containing hydrogen sulfide for supplying said hydrogen sulfide containing gaseous fuel to said fuel electrode.

2. A method of using a compound selected from the group consisting of tungsten disulfide and molybdenum disulfide, comprising the steps of incorporating such compound with a conductor of electricity selected from the group consisting of tungsten carbide and hard coal in the fuel electrode of a fuel cell and oxidizing a fuel containing hydrogen sulfide on said electrode for generating electrical energy.

3. The method as claimed in claim 2, said conductor being tungsten carbide.

4. The method as claimed in claim 2, said conductor being hard coal.

5. The method as claimed in claim 2, further comprising incorporating at least one compound selected from the group consisting of the sulfides of tantalum, vanadium, titanium, and zirconium into said fuel electrode.

6. The method as claimed in claim 2, said conductor being a powdered substance making up 10 to 50 weight-% of said fuel electrode, the step of incorporating a conductor including mixing said powdered substance with said compound.

7. The method as claimed in claim 6, said powdered substance making up 20 weight-% of the fuel electrode.

8. The method as claimed in claim 2, the step of oxidizing further including the steps of electrically connecting said conductor of electricity to an oxygen electrode, contacting said fuel electrode and said oxygen electrode with a common acid electrolyte, and supplying said oxygen electrode with oxygen.

9. The method as claimed in claim 8, said acid electrolyte being sulfuric acid.

10. The method of generating electrical energy in a fuel cell comprising a fuel electrode comprising at least one compound selected from the group consisting of tungsten disulfide and molybdenum disulfide and a conductor of electricity selected from the group consisting of tungsten carbide and hard coal, an oxygen electrode, and an electrolyte, comprising passing a gaseous fuel containing at least $H_2S$ on said fuel electrode and a gaseous oxidant on said oxygen electrode, thereby generating electrical energy.

11. The method as claimed in claim 10, said conductor being tungsten carbide.

12. The method as claimed in claim 10, said conductor being hard coal.

13. The method as claimed in claim 10, wherein said fuel electrode has incorporated therein at least one compound selected from the group consisting of the sulfides of tantalum, vanadium, titanium, and zirconium.

14. The method as claimed in claim 10, wherein said fuel consists essentially of hydrogen sulfide.

15. The method as claimed in claim 10, said conductor being a powdered substance making up 10 to 50 weight-% of said fuel electrode, admixed with said compound.

16. The method as claimed in claim 15, said powdered substance making up 20 weight-% of the fuel electrode.

17. The method as claimed in claim 10, in which said conductor of electricity is electrically connected to said oxygen electrode and said fuel electrode and said oxygen electrode contact a common acid electrolyte, and wherein said oxidant is oxygen.

18. The method as claimed in claim 17, wherein said acid electrolyte is sulfuric acid.

19. In a method of generating electrical energy, the improvement in combination therewith comprising the steps of:
  a. connecting an electrically conductive part selected from the group consisting of tungsten carbide and hard coal to at least one compound selected from the group consisting of tungsten disulfide and molybdenum disulfide, thereby forming a connection, and
  b. oxidizing a fuel containing hydrogen sulfide at said connection.

20. The method as claimed in claim 19, the step of connecting including
  a. mixing said part, dispersed as powder, with said compound in powdered form, and
  b. compacting and sintering the resulting mixture.

21. The method as claimed in claim 20, said part being tungsten carbide.

22. The method as claimed in claim 20, said part being hard coal.

23. The method as claimed in claim 20, said part making up 10 to 50 weight-% of the sintered mixture.

24. The method as claimed in claim 23, said part making up 20 weight-% of the sintered mixture.

25. The method as claimed in claim 20, further including the step of mixing the powdered part and compound with powder of at least one compound selected from the group consisting of the sulfides of tantalum, vanadium, titanium, and zirconium.

26. The method as claimed in claim 19, further including the steps of electrically connecting said part to an oxygen electrode, contacting said part, said compound, and said oxygen electrode with a common acid electrolyte, and supplying said oxygen electrode with oxygen.

27. The method as claimed in claim 26, said acid electrolyte being sulfuric acid.

* * * * *